Figure 3:
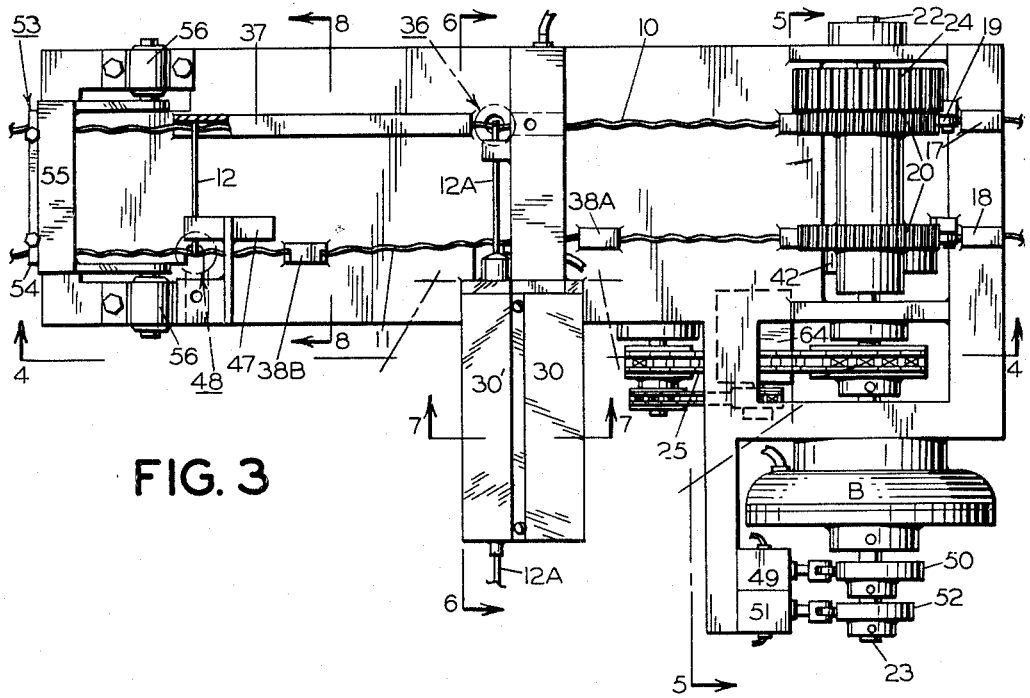

Nov. 28, 1961  B. M. FINGERUT  3,010,493
MACHINE FOR MAKING MASONRY REINFORCEMENT
Filed May 1, 1961  3 Sheets-Sheet 1

INVENTOR.
BORIS MICHAEL FINGERUT
BY
ATTORNEY

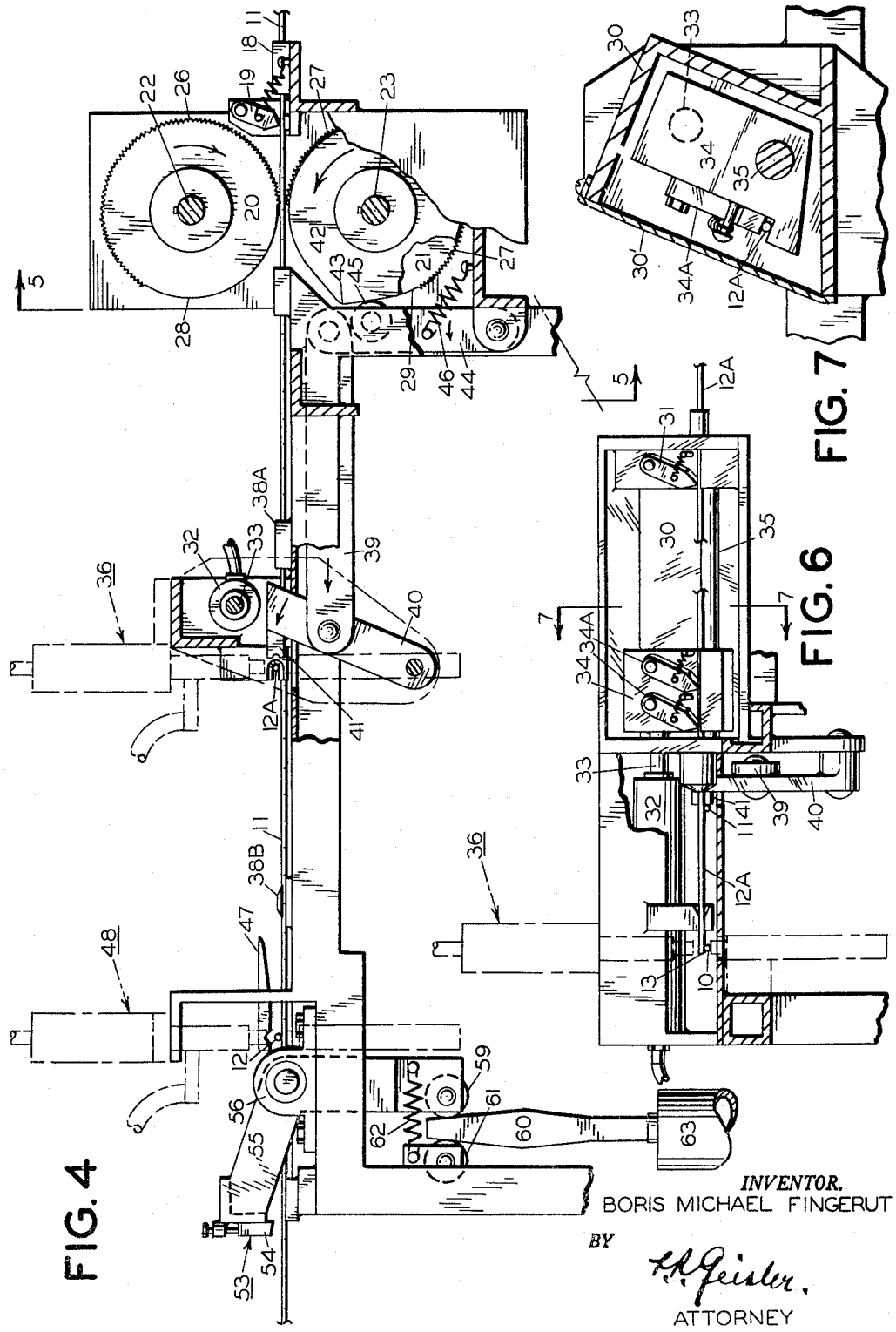

Nov. 28, 1961     B. M. FINGERUT     3,010,493
MACHINE FOR MAKING MASONRY REINFORCEMENT
Filed May 1, 1961     3 Sheets-Sheet 3
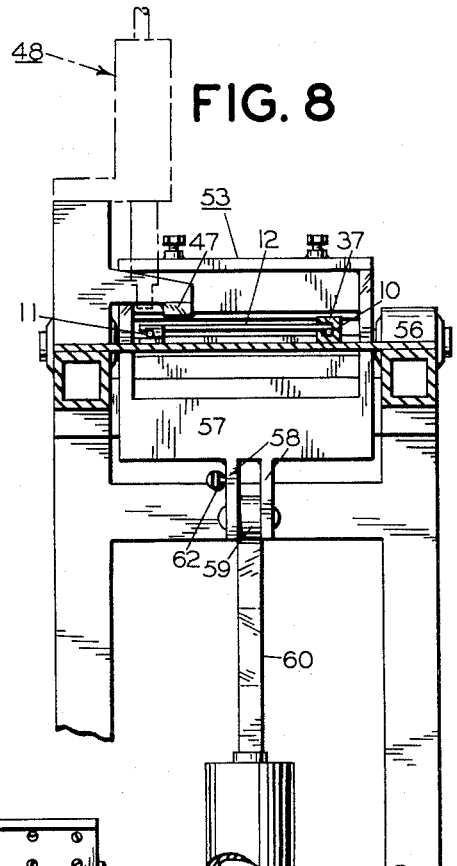
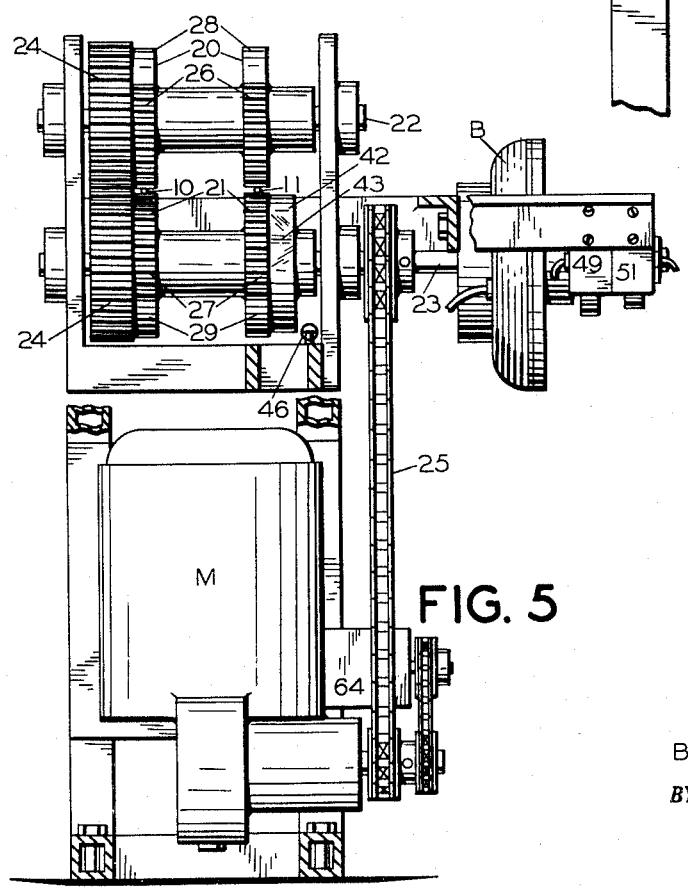
*INVENTOR.*
BORIS MICHAEL FINGERUT
BY
ATTORNEY

United States Patent Office 3,010,493
Patented Nov. 28, 1961

3,010,493
MACHINE FOR MAKING MASONRY REINFORCEMENT
Boris M. Fingerut, Lake Grove, Oreg., assignor to Portland Wire & Iron Works, Portland, Oreg., a corporation of Oregon
Filed May 1, 1961, Ser. No. 106,647
6 Claims. (Cl. 140—112)

This invention relates to the manufacture of metal reinforcements for masonry walls of various types, including particularly walls composed of layers of premolded units, such as blocks of concrete or similar cementitious mixtures, glass blocks, bricks, etc., and including both single and double wall construction.

Specifically the present invention relates to the manufacture of a well-known general type of metal reinforcement which is composed of a pair of spaced main wires or rods connected at regular intervals by transverse wires or rods extending substantially at right angles thereto, each transverse wire or rod having its ends secured on the main wires or rods respectively by welding.

While it would be possible in making such metal reinforcment to use pre-cut transverse wires of the exact length desired and to weld the ends of such pre-cut wires to the spaced main side wires respectively, such procedure, when the reinforcement is to be produced on a large scale and at reasonable cost, would be too impractical and costly. Consequently it has become customary, in the machine manufacture of this particular type of reinforcement, to cut each transverse wire from a continuous wire fed into one side of the machine and to cut each transverse wire from the fed-in wire at the time the welding to the main wires takes place. However, the problem encountered by this method is the practical impossibility of severing the transverse wire from the fed-in supply wire at the exact point where the welding of this wire to the near side main wire occurs and at the same instant in which the welding takes place. A way in which this difficulty has been met is by having the transverse wire severed from the fed-in side wire at a distance out from its welding on the near side main wire at the time of the welding of the wire to the main wires. This leaves an undesired end of each transverse wire extending beyond one side of the completed reinforcement and such extending end of each transverse wire is then subsequently cut off as a supplemental operation.

When such manufacture of the reinforcement takes place on a large scale the cutting off and wasting of this extending end portion of each transverse wire has been found to mount up to a considerable loss of material and consequently to add appreciably to the production cost of the reinforcement. An object of the present invention accordingly is to provide an improved machine for manufacturing such a masonry reinforcement in which this waste of material will be entirely eliminated and in which each transverse wire will be cut off initially from the fed-in side wire in the exact length desired, so that only a single cutting operation is required for each transverse wire.

A related object of the invention is to provide an improved machine for this purpose in which the welding of each transverse wire to the main wires of the reinforcement will always take place, as desired, at the ends of the transverse wires respectively.

A further object of the invention is to provide an improved machine for the manufacture of a masonry reinforcement of the type above indicated in which the two main wires can be crimped throughout their extent with both crimped wires confined entirely to the same place and with the welding of the transverse wires to the crimped main wires automatically occurring at the ends of the transverse wires without any waste of material.

An additional object of the invention is to provide an improved machine for fabricating the particular masonry reinforcement in question which will be simple and practical in construction and in method of operation.

The manner in which these objects and other advantages are attained with the machine of the present invention, and the construction and manner of operation of the improved machine will be briefly described with reference to the accompanying drawings.

Figure 1:
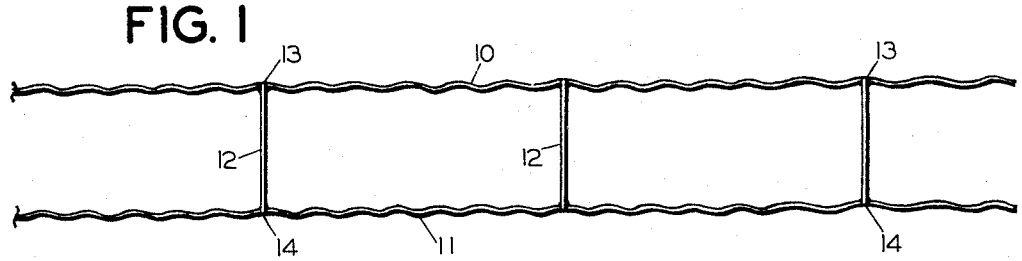
Figure 2:
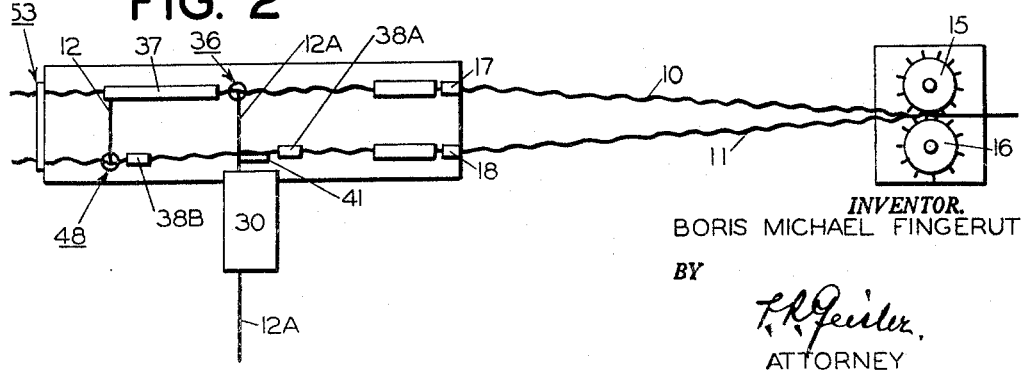

In the drawings:
FIG. 1 is a plan view of the masonry reinforcement as produced by the machine of the present invention;
FIG. 2 is a diagrammatic plan view of the entire machine;
FIG. 3 is an enlarged plan view of that portion of the machine located beyond the crimpers for the side wires;
FIG. 4 is a sectional side elevation on line 4—4 of FIG. 3, but drawn to a larger scale;
FIG. 5 is a sectional elevation on line 5—5 of FIG. 3, drawn to the same scale as FIG. 4;
FIG. 6 is a sectional elevation on line 6—6 of FIG. 3, drawn to the same scale as FIGS. 4 and 5;
FIG. 7 is a sectional elevation on line 7—7 of FIGS. 3 and 6 drawn to the same scale as FIG. 6; and
FIG. 8 is a sectional elevation on line 8—8 of FIG. 3 drawn to the same scale as FIG. 6.

The particular masonry reinforcement, for the manufacture of which the machine of the present invention has been developed, and which is shown in FIG. 1, consists of two main side wires 10 and 11 which are connected at predetermined intervals by transverse wires 12. The transverse wires 12 are secured to the main wires by having their ends 13 and 14 welded on the main wires 10 and 11 respectively, and the ends of the transverse wires terminate at the main wires and thus at the points where the transverse wires are welded to the main wires.

Preferably the main side wires 10 and 11 are crimped throughout their extent, although the machine of the present invention could also be used for manufacturing the masonry reinforcement with straight main wires in place of crimped main wires. However, crimped main wires for such reinforcement are generally preferred to staight side wires inasmuch as an increased bond of these wires with the masonary is obtained when the wires are crimped, and consequently the drawings show the machine adapted for the manufacture of the reinforcement with crimped side wires. As is well-known, it is necessary, with such crimped side wires, that both wires shall be confined entirely to a common plane, and this occurs in the manufacture of the reinforcement in the present machine.

Referring now to FIG. 2, the wire supplies for the two main wires 10 and 11 are drawn from a pair of spools or coils of wire (not shown), as is customary, and each wire is required to be pulled along through well-known straightening and tensioning means (not shown), which is also customary in the manufacture of reinforcements of this general type, such straightening and tensioning means serving to remove any inadventent kinks in the wires and also to provide enough tension to the moving wires so that neither wire will pass through the machine more rapidly than desired. The feeding means in the machine for each of these wires, by which these two main wires are drawn into the machine, and which feeding means controls the movement of the wires and consequently the travel of the reinforcement during its manufacture in the machine, will be described presently.

As the wires are drawn into the machine they are drawn between a pair of crimping cylinders indicated diagrammatically at 15 and 16 in FIG. 2. These crimping cylinders are mounted on vertical axes and have identical, radially-extending, equally spaced crimping blades on their peripheries, the blades from one cylinder extending part way into the middle portion of the spaces between the blades of the other cylinder. Both cylinders are connected with meshing gears (not shown) so that they will always rotate at exactly the same speed in opposite directions. Such wire crimping means is well-known in the art and need not be further described. The drawing of the two main side wires through the two crimping cylinders causes both wires to be identically and correspondingly crimped.

From the crimping cylinders the main wires 10 and 11 pass through a pair of stationary guideways 17 and 18 respectively (FIG. 3) which are spaced apart transversely a distance somewhat less than the final width desired for the reinforcement. This is an important feature and the reason for this will later be apparent. Each main wire 10 or 11, after passing through its respective guideways 17 or 18, passes under a hinged holder or gripper arm 19, one of which is shown in FIG. 4, which allows the wire to move in a forward direction (thus from right to left as viewed in FIGS. 2, 3 and 4) but prevents any moving or slipping of the wire back in the opposite direction.

Each of the wires 10 and 11 is then engaged between an upper and a lower drive wheel 20 and 21 (FIGS. 4 and 5). The two pairs of drive wheels 20 and 21 are identical and their manner of operation will be most clearly understood with reference to FIG. 4 which shows the pair of drive wheels for the wire 11. The upper drive wheels 20 for the two pairs are secured on a common shaft 22 and the lower drive wheels 21 are secured on a common shaft 23. All four drive wheels are identical in size and the shafts 22 and 23 are connected by gears 24 so that the two upper drive wheels and the two lower drive wheels will always rotate at the same speed, the directions of rotation being indicated by the arrows in FIG. 4. The shaft 23 is driven from a motor M by suitable sprocket and chain connection indicated at 25 in FIG. 5.

An identical portion of the periphery of each of the two pairs of drive wheels 20 and 21 (FIG. 4) is provided with wire-engaging teeth as indicated at 26 and 27 in FIG. 4. The remaining portion of each drive wheel periphery is smooth, as indicated at 28 and 29. The arrangement is such that the main wires 10 and 11 will be engaged simultaneously by the toothed portions of their respective pairs of drive wheels and then subsequently and simultaneously be engaged by the smooth portions of the peripheries of their respective pairs of drive wheels. The drive wheels rotate constantly at uniform speed, and, due to the tension on the wires as they are drawn through the machine, as previously mentioned, the wires are moved only during the periods in which they are engaged by the toothed portions of their pairs of drive wheels and remain stationary during the alternate periods when contacted by the smooth portions of the peripheries of the wheels since the smooth peripheries slip on the tensioned wires. In order to prevent undesirable load surges on the motor M which drives the pairs of feed wheels an automatically operating magnetic brake (indicated at B) is provided to impose an equalizing load for the motor during the periods when the smooth peripheral portions of the drive wheels slide on the main wires 10 and 11. Actuation of the brake B is produced through a switch assembly 49 (FIG. 3) operated by a cam 50 on the shaft 23. The length of the toothed portions of the peripheries of the drive wheels corresponds to the spacing desired between the transverse wires in the finished reinforcement. Consequently the main wires 10 and 11 move forwardly intermittently in the machine, moving a desired predetermined distance each time, then remaining stationary for a moment. While the wires are stationary the welding of the transverse wires 12 takes place in the manner later explained. The engagement of the toothed portions of the peripheries of the drive wheels with the main wires also has the incidental advantage of causing roughening of the surfacing of the wires, which, like crimping, is desirable in such masonry reinforcement.

The transverse wires 12 are cut from a third wire 12A which is delivered from a third supply spool or coil of wire (not shown) and which third wire, as it is fed into the machine, is drawn through the customary straightening and tensioning means (not shown). This third wire 12A (FIGS. 2, 3 and 6) passes through a housing 30 provided with suitable guideways for the wire. A hinged gripper arm or holder 31 allows travel of the wire 12A in one direction only (thus towards the machine or from right to left as viewed in FIG. 6). An air cylinder 32 has a piston with a piston rod 33 and the outer end of this piston rod is connected to a carriage 34 which slides on a stationary guide rod 35 in the housing 30.

The carriage 34 is provided with a pair of pivoted gripping arms 34A which have gripping engagement with the feed wire 12A when the carriage 34 moves towards the machine, but which slide along the wire 12A in the returning movement of the carriage 34. Thus, as apparent from FIG. 6 movement of the carriage in the feeding direction (that is, from right to left as viewed in FIG. 6) causes the wire 12A to be moved in that direction a distance equal to the amount of travel of the carriage but the wire 12A is held stationary during the opposite or return stroke of the carriage. The travel of the carriage, corresponding to the travel of the piston in the air cylinder 32, is equal exactly to the desired length for each transverse wire 12 in the reinforcement and thus to the desired width of the finished reinforcement. The housing 30 has a removable cover 30'.

Each feeding movement or stroke of the carriage 34 brings the end of the wire 12A exactly over the furtherest main wire 10 and beneath a first welding assembly 36. The feeding stroke of the piston is completed by the time the smooth peripheral portions of the drive wheels 20 and 21 come into engagement with the main wires 10 and 11. In other words, the feeding of the third wire 12A into the machine is completed, and the end of this wire 12A will be in position to be welded to the main wire 10, by the time the main wires 10 and 11 become momentarily stationary.

Following the welding of the end of the wire 12A to the main wire 10 at 13 the wire 12A is cut, as presently explained, the cut-off portion being the exact length desired for a transverse wire 12. The welding of the other end of the cut-off portion or transverse wire 12 to the main wire 11 is performed by a second welding assembly, later referred to, and takes place during the next cycle of operation.

The two main wires 10 and 11, after leaving their respective pairs of drive wheels, continue temporarily to be the same distance apart, and thus a distance slightly less than the desired width of the finished reinforcement and the desired length of the transverse wires 12. The main wire 10 is guided in a straight path beneath the first welding assembly 36 and thence through a guideway 37, which is open on the side facing the center line of the machine in order to accommodate the transverse wire 12, one end of which has now been welded to the main wire 10 and which has been cut off from the third wire 12A. The other main wire 11, however, after passing through a guideway 38A (FIG. 3) passes through a guideway 38B which is so arranged as to increase the spacing between the two main wires to that desired for the finished reinforcement. In other words, the spacing between the main wires 10 and 11, as the wire 11 passes through the guideway 38B, and throughout the rest of the machine, is equal to the desired width for the reinforcement, which corresponds to the length of the transverse wires 12 as these are cut from the third wire 12A. However, at the time the welding of the end of the third wire 12A to the main wire 10 occurs, and during the cutting of the third wire 12A to produce a transverse wire 12, the spacing between the main wires 10 and 11 is less than the desired width for the reinforcement so as to enable the transverse wire to be cut off from the third wire 12A at the exact length desired. The cutting of the transverse wire from the third wire 12A occurs after the welding of the end of the wire 12A to the main wire and just as the main wires 10 and 11 resume their forward travel in the machine. This cutting is performed by a cutter assembly shown best in FIG. 4.

The cutter assembly for the third wire 12A includes a cutting head 41 which engages the wire 12A adjacent the end of the housing 30 (see also FIG. 6). The cutter head is carried on a pivoted arm 40. A link 39 connects the arm 40 with a pivoted arm 44. The arm 44 carries a cam engaging roller 45. A disc 42 is secured on the shaft 23 for the lower drive wheels 21. This disc 42 has a cam lobe 43 on its periphery which engages the roller 45 and causes movement of the arm 44 and therewith actuation of the cutter assembly. A spring 46 maintains the roller 45 in contact with the periphery of the disc 42 and returns the cutter head to normal inactive position immediately following the wire-cutting operation. It will be noted from FIG. 4 that the disc 42 is so arranged with respect to the pairs of drive wheels 20 and 21 that the cam lobe 43 will engage the roller 45 to operate the cutter just as the toothed portions 26 and 27 of the drive wheels 20 and 21 engage the main wires 10 and 11. In other words, the cutting head 41 performs the cutting action on the the third wire 12A just as the main wires 10 and 11 start to move forwardly in the machine. The timing of the cutting action is important otherwise a bending of the wire 12A and some dislocation of the adjacent unwelded end of the cut-off section (forming the transverse wire 12 on the reinforcement would occur.

As the main wires 10 and 11 move forwardly beyond the first welding assembly 36 and the cutter assembly, carrying along the cut-off section of the third wire 12A which is now a transverse wire 12, and one end of which has been welded on the main wire 10 while the other end rests on the main wire 11, the main wire 10 and welded end of the crosswire 12 pass through a guideway 37 (FIGS. 2 and 3). This guideway 37 keeps the wire 10 in a straight path. The side of the guideway 37 facing the center line of the machine is slotted from one end to the other, so as to allow the transverse wire 12 to move along freely with the main wire 10. The other main wire 11, however, passes through a guideway 38B which moves the main wire 11 outwardly until the spacing between the two main wires is equal to the desired width for the finished reinforcement (and to the length to which the transverse wire 12 had been cut). The top of this guideway 38B (as shown best in FIG. 4) has an inclined slope at each end so as to enable the unwelded end of the transverse wire 12 to ride easily over the top of the guideway 38B. The unwelded end of the transverse wire 12 then passes under a guide foot 47 (FIGS. 3 and 4) which keeps the end of the wire 12 from becoming spaced too far above the main wire 11. The wire 11 and the end of the wire 12 then come under a second welding assembly 48.

The second welding assembly 48 is located a distance from the third wire 12A and its cutter equal exactly to the distance travelled by the main wires 10 and 11 during each cycle of operation. In other words, the distance of the second welding assembly 48 from the third wire feeding means and cutter is equal to the length of the toothed portions of the peripheries of the pairs of drive wheels 20 and 21. Consequently when the unwelded end of the transverse wire 12 is brought beneath the welding assembly 48 the travel of the main wires 10 and 11 again is momentarily halted. Thereupon the welding assembly 48 is activated and the welding of the loose end of the transverse wire to the main wire 11 occurs and completes the forming of the reinforcement.

Since the length at which the transverse wire 12 has been cut from the third wire 12A is equal to the desired width for the reinforcement, and since the two main wires 10 and 11 have become separated the desired distance prior to the welding of the end of the transverse wire 12 by the second welding assembly 48, the transverse wire 12 will now have its ends secured to the main wires 10 and 11 respectively without either end of the transverse wire 12 extending any appreciable distance beyond the main side wires 10 and 11. Consequently any further trimming of the transverse wire and wasting of material is avoided. This is the main feature of the invention.

As apparent, the two welding assemblies 36 and 48 are actuated simultaneously, and weld opposite ends of consecutive transverse wires 12. Actuation of these welding assemblies is controlled by a switch assembly 51 (FIG. 3) which is operated by a cam 52, secured on the driven shaft 23. The switch assembly 51 also (through suitable relays and air control valves which are not shown) causes the operation of the air piston in the air cylinder 32 and thus the feeding of the third wire 12A to the machine for providing the transverse wires 12.

When a predetermined desired length for the finished reinforcement has been delivered from the machine an end cutter assembly 53 (FIGS. 3, 4 and 8) severs the finished length and cuts both main wires 10 and 11. This end cutter assembly includes an adjustably mounted cutter blade carried on an arbor 55 the two side arms of which are pivotally supported in a pair of bearings 56. The side arms of the arbor extend downwardly beyond their respective pivotal mountings and are connected at the bottom by a cross bar 57. A pair of brackets 58 (FIG. 8) centrally located on the bottom cross bar 57 support a roller 59 for engagement by a cam thruster element 60. A companion roller 61 (FIG. 4), mounted on the frame of the machine, engages the opposite edge of the cam element 60. A spring 62 holds the roller 59 against the cam element and thus holds the arbor 55 and cutter blade 54 in the normal raised and inoperative position shown in FIG. 4 at all times except when the cam element 60 is moved. The cam element 60 is carried on the end of the piston rod of an air piston located in an air cylinder 63.

Operation of this air cylinder and piston, and thus operation of the cut-off assembly 53, occurs through the means of suitable supply valves and operating solenoids (not shown) controlled by a switch assembly and actuating rotating cam located in a housing 64 (FIG. 5), the rotating cam being driven from suitable connection with the motor shaft. The arrangement is such, with respect to the pairs of drive wheels 20 and 21, which are also driven by the motor M, that a predetermined number of rotations of the drive wheels, and consequently a predetermined number of cycles of operation of the machine will take place and a corresponding length of the fabricated reinforcement be produced between each operation of the end cutter assembly 53.

Various modifications could be made in different parts of the machine without changing the general method and manner of operation and without departing from the principle of the invention. The machine as illustrated and described has been found to be very satisfactory and this specification describes what I consider the preferred means for carrying out the invention. It is, however, not my intention to limit the invention otherwise than as set forth in the claims.

I claim:

1. In a machine for making a masonry reinforcement having a pair of substantially parallel main wires connected at regular intervals by transverse wires, feeding means for intermittently drawing the two main wires into the machine in unison, guideways for said main wires holding said main wires spaced apart a distance less than the width desired for the finished reinforcement, a first welding assembly positioned above one of said main wires beyond said guideways, means for intermittently feeding a third wire transversely over the other of said main wires and onto said first mentioned main wire beneath said welding assembly from the side of said machine opposite said welding assembly, said third wire terminating on said first mentioned main wire beneath said welding assembly, a cutter for cutting transverse wires for the reinforcement from said third wire, said cutter positioned outwardly from said other main wire and spaced from said first mentioned wire and said welding assembly a distance equal to the desired width for the finished reinforcement, means for operating said cutter, further guideways for said main wires located beyond said first welding assembly and said cutter, said further guideways causing the spacing between said main wires to be increased to correspond to the desired width for the finished reinforcement, a second welding assembly positioned above the other of said main wires beyond said further guideways and located a distance from said cutter equal to the extent of travel of said main wires with each operation of said first mentioned feeding means, and an end cutter for the finished reinforcement located beyond said second welding assembly, the actuation of said welding assemblies and the operation of said third wire feeding means and of said third wire cutter being synchronized with the operation of said first mentioned feeding means.

2. In a machine for making a masonry reinforcement having a pair of substantially parallel main wires connected at regular intervals by transverse wires, means for intermittently drawing the two main wires into the machine in unison, said means including a pair of continuously rotating feed wheels for each of said main wires with the main wire passing between the wheels of the pair, the wheels of each pair having identical, cooperating, wire-engaging peripheries formed with toothed portions and smooth portions, said toothed portions causing forward travel of said wires while engaging said wires and said smooth portions enabling said wires to remain stationary while in contact with said wheels, the length of said toothed portions corresponding to the desired spacing between the transverse wires in the finished reinforcement, guideways for said main wires beyond said pairs of feed wheels holding said main wires spaced apart a distance less than the desired width for the finished reinforcement, a first welding assembly positioned above one of said main wires beyond said first guideway, means for intermittently feeding a third wire transversely over the other of said main wires and onto said first mentioned main wire beneath said welding assembly from the side of said machine opposite said welding assembly, said third wire terminating on said first mentioned main wire beneath said welding assembly, a cutter for cutting transverse wires for the reinforcement from said third wire, said cutter positioned outwardly from said other main wire and spaced from said first mentioned main wire and said welding assembly a distance equal to the desired width for the finished reinforcement, means connected with said feed wheels for operating said cutter, further guideways for said main wire located beyond said first welding assembly and said cutter, said further guideways causing the spacing between said main wires to be increased to correspond to the desired width for the finished reinforcement, a second welding assembly positioned above the other of said main wires beyond said further guideways and located a distance from said cutter equal to the distance of travel of said main wires with each rotation of said feed wheels, and an end cutter for the finished reinforcement located beyond the said second welding assembly, the actuation of said welding assemblies and the operation of said third wire feeding means and of said third wire cutter being synchronized with the rotation of said feed wheels.

3. In a machine for making a masonry reinforcement having a pair of substantially parallel main wires connected at regular intervals by transverse wires, feeding means for intermittently drawing the two main wires into the machine in unison, guideways for said main wires holding said main wires spaced apart a distance less than the width desired for the finished reinforcement, a first welding assembly positioned above one of said main wires beyond said guideways, means for intermittently feeding a third wire transversely over the other of said main wires and onto said first mentioned main wire beneath said welding assembly from the side of said machine opposite said welding assembly, said third wire terminating on said first mentioned main wire beneath said welding assembly, said last mentioned means including a reciprocating carriage, a wire gripping element on said carriage causing said third wire to be moved by said carriage above said main wires to said welding assembly with each stroke of said carriage in one direction, wire holding means preventing movement of said third wire during the return stroke of said carriage, the length of the stroke of said carriage corresponding to the width desired for the finished reinforcement, a cutter for cutting transverse wires for the reinforcement from said third wire, said cutter positioned outwardly from said other main wire and spaced from said first mentioned main wire and said welding assembly a distance equal to the desired width for the finished reinforcement, means connected with said first mentioned feeding means for operating said cutter, further guideways for said main wires located beyond said first welding assembly and said cutter, said last mentioned guideways causing the spacing between said main wires to be increased to correspond to the desired width for the finished reinforcement, a second welding assembly positioned above the other of said main wires beyond said further guideways and located a distance from said cutter equal to the extent of travel of said main wires with each operation of said first mentioned feeding means, and an end cutter for the finished reinforcement located beyond said second welding assembly.

4. In a machine for making a masonry reinforcement having a pair of substantially parallel main wires connected at regular intervals by transverse wires, means for intermittently drawing the two main wires into the machine in unison, said means including a pair of continuously rotating feed wheels for each of said main wires with the main wire passing between the wheels of the pair, the wheels of each pair having identical, cooperating, wire-engaging peripheries formed with toothed portions and smooth portions, said toothed portions causing forward travel of said wires while engaging said wires and said smooth portions enabling said wires to remain stationary while in contact with said wheels, guideways for said main wires holding said main wires spaced apart a distance less than the width desired for the finished reinforcement, a first welding assembly positioned above one of said main wires beyond said first guideways, means for intermittently feeding a third wire transversely over the other of said main wires and onto said first mentioned main wire beneath said welding assembly from the side of said machine opposite said welding assembly, said third wire terminating on said first mentioned main wire beneath said welding assembly, a cutter for cutting transverse wires for the reinforcement from said third wire, said cutter positioned outwardly from said other main wire and spaced from said first mentioned main wire and said welding assembly a distance equal to the desired width for the finished reinforcement, means connected with said feed wheels for said main wires for operating said cutter, said last mentioned means so arranged as to cause the cutter to cut said third wire as said main wires start to move, a further guideway for said other main wire located beyond said cutter, said further guideway causing said other main wire to move outwardly until the spacing between said main wires corresponds to the desired width for the finished reinforcement, a second welding assembly positioned above the other of said main wires beyond said further guideway and located a distance from said cutter equal to the extent of travel of said main wires with each rotation of said feed wheels, and an end cutter for the finished reinforcement located beyond said second welding assembly.

5. The combination set forth in claim 2 with the addition of crimping cylinders for said main wires located ahead of said pairs of feed wheels and causing said main wires to be crimped as said main wires are drawn between said crimping cylinders by said pairs of feed wheels.

6. In a machine for making a masonry reinforcement having a pair of substantially parallel main wires connected at regular intervals by transverse wires, means for intermittently drawing the two main wires into the machine in unison, said means including a pair of continuously rotating feed wheels for each of said main wires with the main wire passing between the wheels of the pair, the wheels of each pair having identical, cooperating, wire-engaging peripheries formed with toothed portions and smooth portions, said toothed portions causing forward travel of said wires while engaging said wires and said smooth portions enabling said wires to remain stationary while in contact with said wheels, the length of said toothed portions corresponding to the desired spacing between the transverse wires in the finished reinforcement, guideways for said main wires holding said main wires spaced apart a distance less than the desired width for the finished reinforcement, a first welding assembly positioned above one of said main wires beyond said first guideways, means for intermittently feeding a third wire transversely over the other of said main wires and onto said first mentioned main wire beneath said welding assembly from the side of said machine opposite said welding assembly, said third wire terminating on said first mentioned main wire beneath said welding assembly, said last mentioned means including a reciprocating carriage, a wire gripping element on said carriage causing said third wire to be moved by said carriage above said main wires to said welding assembly with each stroke of said carriage in one direction, wire holding means preventing the movement of said third wire during the return stroke of said carriage, the length of the stroke of said carriage corresponding to the width desired for the finished reinforcement, a cutter for cutting transverse wires for the reinforcement from said third wire, said cutter positioned outwardly from said other main wire and spaced from said first mentioned main wire and said welding assembly a distance equal to the desired width for the finished reinforcement, means connected with said feed wheels for said main wires for operating said cutter, a further guideway for said other main wire located beyond said cutter, said further guideway causing said other main wire to move outwardly until the spacing between said main wires corresponds to the desired width for the finished reinforcement, a second welding assembly positioned above the other of said main wires beyond said further guideway and located a distance from said cutter equal to the extent of travel of said main wires with each rotation of said pairs of feed wheels, and an end cutter for the finished reinforcement located beyond said second welding assembly, the actuation of said welding assemblies and the operation of said third wire feeding means and of said third wire cutter synchronized with each rotation of said feed wheels, and the operation of said end cutter for the reinforcement taking place upon a predetermined number of rotations of said feed wheels.

References Cited in the file of this patent

UNITED STATES PATENTS 1,448,566     Muller et al.            Mar. 13, 1923